United States Patent [19]

Wester

[11] 3,815,095

[45] June 4, 1974

[54] GENERAL-PURPOSE ARRAY PROCESSOR

[75] Inventor: Aaron H. Wester, Austin, Tex.

[73] Assignee: Texas Instruments Incorporated, Dallas, Tex.

[22] Filed: Aug. 29, 1972

[21] Appl. No.: 284,529

[52] U.S. Cl. .......... 340/172.5
[51] Int. Cl. .......... G06f 3/00
[58] Field of Search .......... 340/172.5, 173 RC

[56] References Cited

UNITED STATES PATENTS

| | | | |
|---|---|---|---|
| 3,308,436 | 3/1967 | Borck, Jr. et al. | 340/172.5 |
| 3,473,160 | 10/1969 | Wahlstrom | 340/172.5 |
| 3,523,284 | 8/1970 | Washizuka et al. | 340/173 RC |
| 3,551,894 | 12/1970 | Lehman et al. | 340/172.5 |
| 3,611,307 | 10/1971 | Podvin et al. | 340/172.5 |
| 3,623,011 | 11/1971 | Baynard, Jr. et al. | 340/172.5 |
| 3,701,976 | 10/1972 | Shively | 340/172.5 |

*Primary Examiner*—Harvey E. Springborn
*Attorney, Agent, or Firm*—Harold Levine; Rene Grossman; Stephen S. Sadacca

[57] ABSTRACT

A general-purpose array processor allows each processor to transfer its output to any other processor in the array. Each processor contains its own memory, address register, and input selection multiplexer whereby an address may be transferred from a processor memory to its address register; and the information in the address register is used by the selection multiplexer to select one input from all array processor outputs.

2 Claims, 2 Drawing Figures

GENERAL-PURPOSE ARRAY PROCESSOR

This invention relates to electronic digital computers and, more particularly, to a new and improved array processing element and interconnection system for an array processor.

An array processor typically consists of a plurality of identical processing elements which execute simultaneously in parallel. An advantage of the array processor over sequential computing systems is accomplished if the same operation — such as add, multiply, and divide — can be performed on a large number of elements at the same time. Array processors of this description are known in the art.

Additional flexibility and improved efficiency can be realized if the processing elements of an array processor can transfer data to and accept data from various others of said processing elements. This method of direct data transfer between processing elements avoids the necessity of transferring the data from each processing element to a device external to the processing array after each operation. Heretofore, only restrictive methods have been implemented to provide for direct data transfer between processing elements. Array processors are known in the art which allow for direct data transfer only between adjacent processing elements, and others are known which allow direct data transfer between processing elements, all of which are a constant number of processing elements apart. As an example of this latter technique, which is known in the art as the constant displacement addressing technique, the $i^{th}$ processing element denoted $P_i$ sends its output to processing element $P_{(i+k)}$ for some constant k.

The invention herein is an improvement over those interconnection schemes known in the art in that each processing element in the processor array is able to select its input from any processing element, including itself.

The invention is embodied in a system containing an array of processing elements, wherein each processing element contains its own memory, arithmetic unit, address register, and multiplexer selection network. The output of each processing element is one input to each selection network of all processing elements. An address is transferred from memory and placed in the address register in each processing element. Then, the address in each register is used by its respective multiplexer selection network to select one input for processing during the next operation.

A common address line and a cable of control and data lines is provided to each processing element from a control unit. A typical control unit command to all processing elements could be as follows: load the data on your input lines into register A, add the contents of register A to the contents of memory location B, and store the sum in memory location C.

It is, therefore, an object of this invention to provide a new and improved interconnection system for an array processor.

It is a further object to provide a new and improved processing element for use in an array processor with flexible addressing means.

For a more complete understanding of the invention herein and for further objects and advantages thereof, reference may now be had to the following description taken in junction with the accompanying drawings in which.

Figure 1:
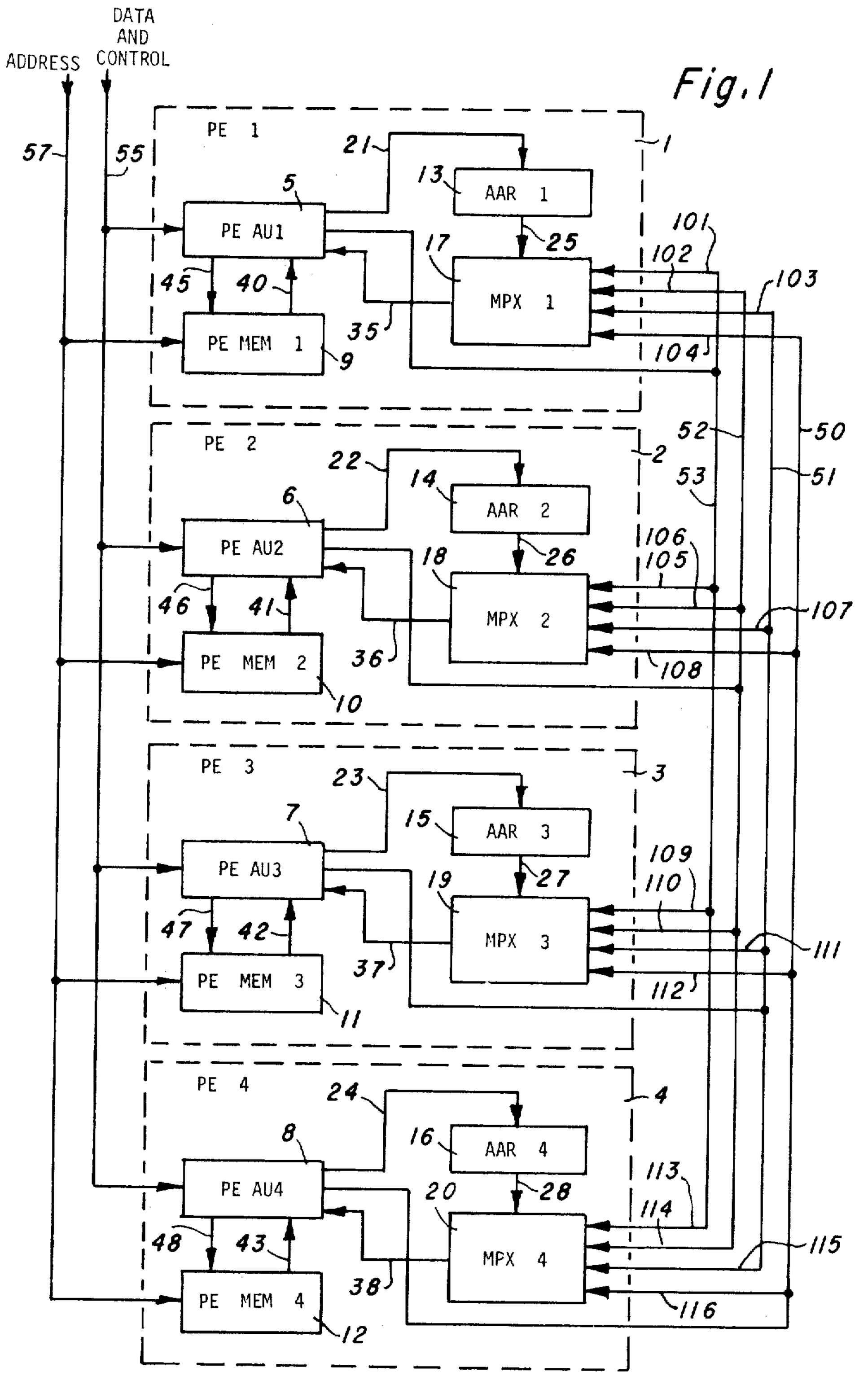
FIG. 1 illustrates the arrangement of processing elements in an array processor for which the present invention may apply.

Referring now to FIG. 1, the invention is shown as embodied in an array processor containing four processing elements. It is to be understood that the invention is equally applicable to an array processor containing any number of processing elements; and, thus, the scope of the invention is not limited to a processor containing only four processing elements.

The processing elements 1–4 are under control of control and data cable 55. Each processing element 1–4 contains, respectively, an arithmetic unit 5–8, a random access memory 9–12, an address register 13–16, and a multiplexer selection network 17–20. Each random access memory 9–12 in each respective processing element 1–4 is addressed by means of a common address line 57. Each processing element arithmetic unit 5–8 can transfer data via lines 45–48 to its respective memory 9–12, and lines 40–43 are used for data transfers from each memory 9–12 to its respective arithmetic unit 5–8.

In addition, address registers 13–16 are loaded with addresses via lines 21–24 from the respective arithmetic units 5–8. Each multiplexer 17–20 has the four inputs 101–104, 105–108, 109–112, and 113–116, respectively, representing one input from every processing element 5–8 in the array. The output data from each processing element 5–8 is transferred via output lines 30–33, respectively, to four buses 50–53 which provide common input to each multiplexer 17–20. Each multiplexer 17–20 receives a $\log_2 N$ bit address, for a processing array of N elements, via lines 25–28 respectively; and the output of each multiplexer is directed to each corresponding arithmetic unit 5–8 via lines 35–38.

Figure 2:
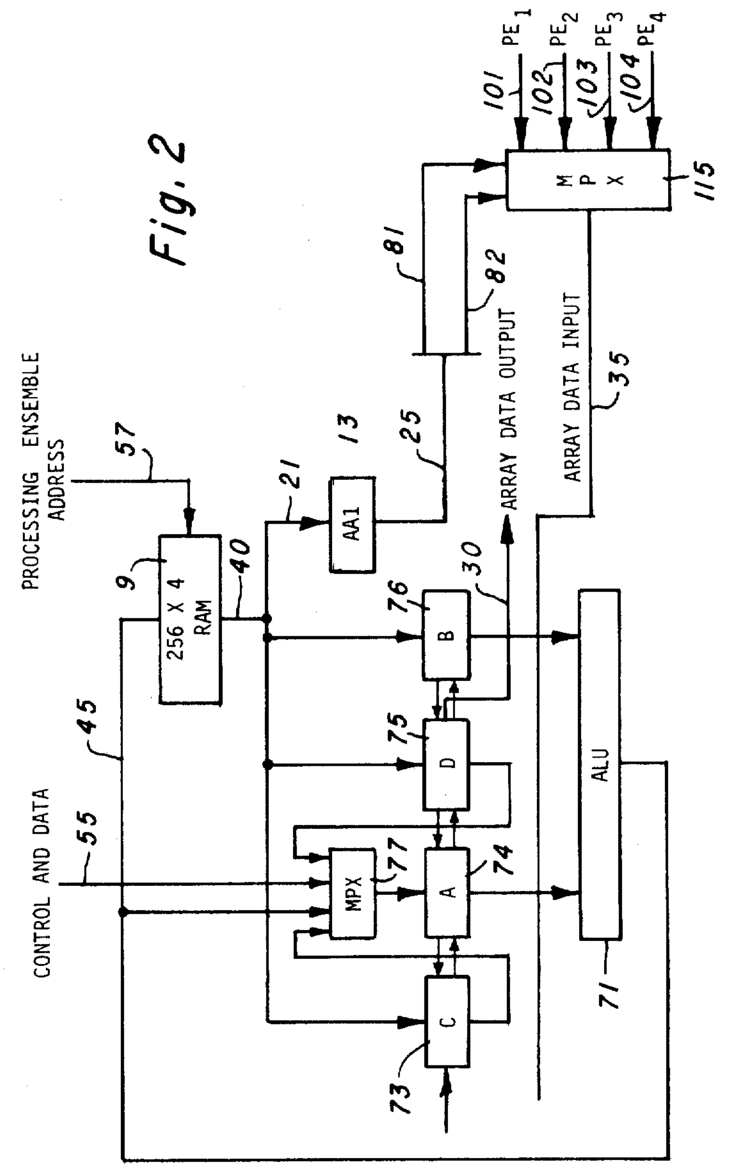
FIG. 2 illustrates the arrangement of components internal to the processing elements shown in FIG. 1.

Now, referring to FIG. 2, the processing elements shown in FIG. 1 are described in more detail; and, more particularly, the internal structure of processing element 1 is illustrated. Processing element 1 contains a random access memory 9 which is composed of 256 4-bit words of bipolar active element memory. Said random access memory 9 is wired to read 4-bit words from line 45 and store them in said memory, both operations being addressed by an address input to the memory 9 on line 57. Control and data is provided to processing element 1 via control and data cable 55. Processing element 1 contains a single arithmetic logic unit 71 which is capable of performing arithmetic and logical operations. The C-register 73, A-register 74, D-register 75, and B-register 76 are all 4-bit registers. The C-register 73, A-register 74, and D-register 75 are left/-right shift, parallel input/output registers serially interconnected to perform arithmetic and logical shifts independently or concatenated. These three registers utilize their shift capabilities in multiply, divide, and all shift operations. Also, all serial array transfers are performed using the C-register 73 and D-register 75 for simultaneous data input and output. The C-register 73 and D-register 75 are loaded in parallel from data sent from random access memory 9 via line 40. The A-register 74 may be loaded either from the C-register 73, D-register 75, output of the arithmetic logic unit 71, or from the control and data cable 55 by means of the 4-input multiplexer 77. The A-register 74 and the B-register 76 form the two operand registers for the arithmetic unit 71.

Data may be transferred from the memory 9 via line 21 to the address register 13. The output of address register 13 is a cable 25 containing two address lines 81 and 82. The two address lines 81 and 82 are the coded inputs to the selection multiplexer 115, and the 2-bit code on lines 81 and 82 is used by the multiplexer 115 to select one of the four inputs 101–104, corresponding to the outputs of processing elements 1–4, as the multiplexer output 35. Said multiplexer output 35 becomes the input data for the processing element 1 on its next operation. The output from processing element 1 issues from the D-register via line 30.

The components shown in FIG. 2 are known and understood by those skilled in the art and standard manufactured items. For reference to the gate level of the components shown in FIG. 2, the C-register 73, A-register 74, D-register 75, and B-register 76 may be implemented by part TI-SN54194, arithmetic logic unit 71 by part TI-SN54181, multiplexer 77 by part TI-SN54153, address register 13 by part TI-SN74163, and multiplexer 115 by part TI-SN74153. These parts are manufactured by Texas Instruments Incorporated, may be purchased from Texas Instruments by specifying these part numbers, and are described in the Texas Instruments Integrated Circuit Handbook, published in 1971.

Having described the invention in connection with certain specific embodiments thereof, it is to be understood that certain modifications may now suggest themselves to those skilled in the art and is intended to cover such modifications as fall within the scope of the appended claims.

What is claimed is:

1. An array processor computer, said array processor computer having central control lines providing control and input data signals comprising:

a. an array of processing elements, each receiving said central control lines for carrying out commands specified by said control signals on data provided by said input data signals;

b. each of said processing elements including:

1. a random access memory for storing said input data,
2. an arithmetic unit having an input and an output for carrying out arithmetic operations on the data stored in said memory,
3. an address register for selecting one of said processing elements from which data is to be read, and
4. a multiplexer having inputs from its own arithmetic unit and from the arithmetic units of all of the other processing elements, said multiplexer being responsive to said address register for connecting the output of the arithmetic unit of the selected processing element to the input of its own arithmetic unit.

2. The array processor computer claimed in claim 1, each arithmetic unit of each processor including left/-right shift registers serially interconnected to perform arithmetic and logical shifts.

* * * * *